United States Patent

[11] 3,587,832

| [72] | Inventors | Peter M. Robinson<br>Sutton Coldfield;<br>Peter J. Jenkins, Sandbach, England |
|---|---|---|
| [21] | Appl. No. | 770,562 |
| [22] | Filed | Oct. 25, 1968 |
| [45] | Patented | June 28, 1971 |
| [73] | Assignee | The Dunlop Company Limited<br>London, England |
| [32] | Priority | Nov. 3, 1967 |
| [33] | | Great Britain |
| [31] | | 50082/67 |

[54] CONVEYORS
6 Claims, 5 Drawing Figs.

[52] U.S. Cl. ................................................ 198/184
[51] Int. Cl. ............................................. B65g 15/00
[50] Field of Search .......................................... 198/184, 1; 302/29, 30; 226/7; 271/74

[56] References Cited
UNITED STATES PATENTS

| 3,228,682 | 1/1966 | Buccicone | 271/74 |
| 756,600 | 4/1904 | Dodge | 302/31 |
| 2,176,307 | 10/1939 | Lamb | 302/29 |
| 3,362,755 | 1/1968 | Macks | 302/29 |
| 3,297,513 | 1/1967 | Robinson | 198/193 |

Primary Examiner—Richard E. Aegerter
Attorney—Stevens, Davis, Miller and Mosher

ABSTRACT: A belt conveyor wherein a load-carrying portion of the belt is supported by causing the air pressure below that portion to be greater than the air pressure above that portion of the belt, of which the following is a specification.

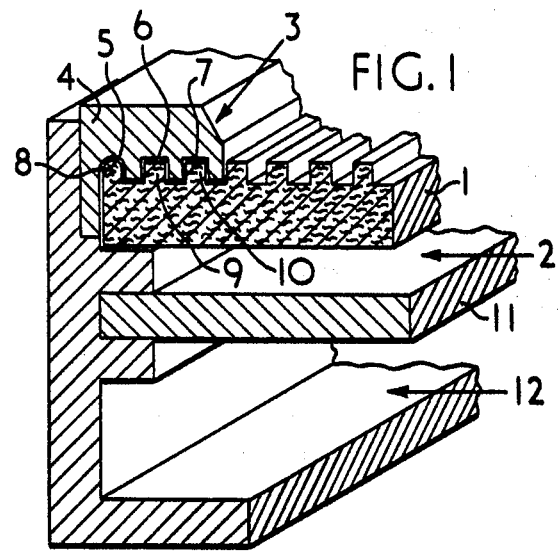
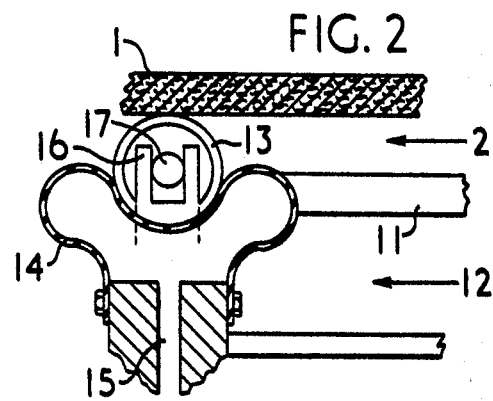

PATENTED JUN28 1971 3,587,832
SHEET 2 OF 2
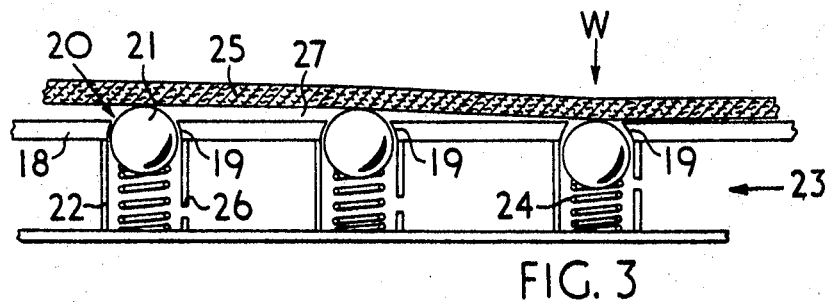
FIG. 3
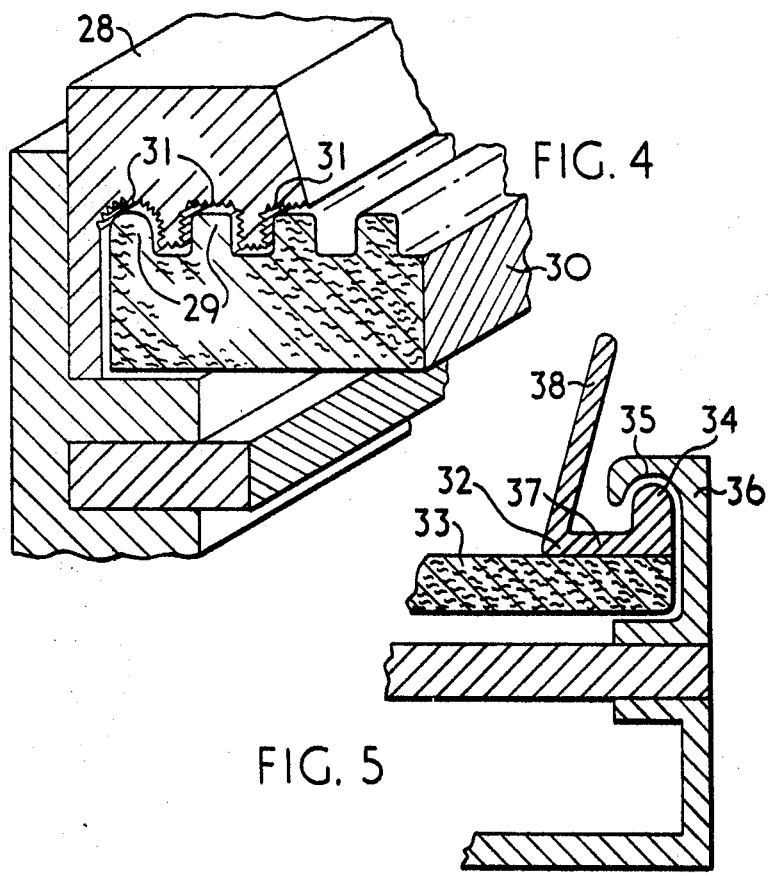
FIG. 4
FIG. 5
INVENTORS
PETER M. ROBINSON
PETER J. JENKINS
By Stevens, Davis, Miller & Mosher
ATTORNEYS

CONVEYORS

This invention relates to conveyors.

One object of the invention is to provide a belt conveyor in which the load-carrying portion of the belt is uniformly supported.

According to the invention, a conveyor comprises an endless belt and support means for the belt, said support means being arranged to cause a difference in fluid pressure to exist between the upper and lower surfaces of at least one of the belt's runs.

Preferably, the belt is more flexible in a longitudinal direction than in a direction transverse to its length. Such a belt may be made from belting of the kind described in the specification of U.K. Pat. No. 974,131, that is, it may comprise a flexible plastic material having embedded therein a composite reinforcement comprising two layers of individually flexible metal cords and a textile reinforcement located between the cord layers, the metal cords in each layer lying substantially parallel with each other and substantially at right angles to the length of the belting and being closely and uniformly spaced along the length of the belting, the separation of the metal cord layers being sufficient to confer a substantial degree of transverse rigidity upon the belting as a whole.

In a conveyor according to the invention, the means for providing support for the belt may be in the form of a pressure chamber beneath the belt the upper wall of the pressure chamber being constituted by the belt and the chamber being adapted to be connected to air-pressure supply means. The pressure chamber is substantially coextensive with the load-carrying portion of the belt, and is provided with sealing means to reduce the leakage of air form the pressure chamber. The sealing means may comprise side seals to reduce leakage between the belt and the side edges of the pressure chamber and end seals to reduce leakage between the belt and the end edges of the pressure chamber.

The side seals may each be in the form of a labyrinth seal comprising one or more longitudinally extending formations on the belt interengaging with complementary longitudinally extending formations associated with the pressure chamber. The shapes of the formations on the belt edges and the corresponding formations associated with the pressure chamber are such that the leakage path for the air is narrow and tortuous. The labyrinth seal may comprise a sealing member extending along and in substantially airtight engagement with each longitudinal edge of the pressure chamber and having formed therein a series of channels, and a corresponding series of ribs formed on the belt near its edge and locatable within the channels, the ribs and channels of the two surfaces constituting the interengaging longitudinally extending formations.

The provision of sealing means in a conveyor according to the invention restricts leadage of air and allows an air pump of relatively small capacity to be used to provide a sufficient volume of air to maintain a sufficiently high pressure within the pressure chamber below the belt for it to carry the required load. Where labyrinth seals are employed as the side seals, the rate of air leakage and hence the rate of air supply required from the air pump depends on the size and number of complementary interengaging formations, and thus a predetermined rate of leakage can be achieved by designing the seals accordingly.

The sealing member extending along the length of the pressure chamber may be of any of a large variety of ferrous and nonferrous materials including rigid polymers and aluminum alloys, while the belt edges or at least their surfaces may be of a semirigid such as polypropylene. The main functional consideration in choosing these materials is that the coefficient of friction between the belt edge and the sealing member should be low.

The lower wall of the pressure chamber of a conveyor according to the invention may take the form of a pressure distribution plate which separates the pressure chamber from a supply chamber below the pressure chamber, the supply chamber being directly connected to the air pump.

The pressure distribution plate may be of a porous or nonporous material, arranged to allow the passage of a diffused flow of air. Where the plate is of a porous material which allows rapid diffusion of fluids therethrough, no adaption of the plate is required, but where the plate is of a nonporous material it is adapted to allow the required flow of air to pass either by forming a plurality of small apertures therethrough, or by forming apertures through the plate and providing in associated with the apertures, fluid flow control valves which are engageable with the belt and responsive to the downward thrust of the belt thereon.

When apertures are formed in a nonporous plate of this type, they may be arranged in a suitable pattern to produce as far as possible a substantially constant fluid pressure over the whole air-supported surface of the belt.

Embodiments of the invention will now be described by way of example, with reference to the accompanying drawings in which:

FIG. 1 shows a sectional perspective view of a portion of one side of a conveyor according to the invention;

FIG. 2 shows a cross section taken in the longitudinal direction with respect to the belt, through the conveyor of FIG. 1 illustrating the construction of one of the end seals thereof;

FIG. 3 shows a cross secton, taken in the longitudinal direction with respect to the belt through another conveyor according to the invention, illustrating the use of a nonporous pressure distribution plate and associated fluid flow control valves;

FIG. 4 shows, in a view similar to that of FIG. 1, a conveyor otherwise similar to that of FIG. 1 but incorporating modified side seals; and FIG. 5 shows a cross-sectional view, taken in the transverse direction with respect to the belt, of one side of a further alternative conveyor according to the invention.

In a first embodiment of the invention shown in FIG. 1, a conveyor comprises an endless belt 1 having a ribbed load-carrying surface and a pressure chamber 2 for providing support for the belt, the chamber being arranged to be connected to air pressure supply means (not shown).

The pressure chamber is substantially coextensive with the load-carrying portion of the belt and its longitudinal edges are each provided with sealing means comprising side seals in the form of labyrinth seals 3 to control leakage of air from the pressure chamber between the belt and the longitudinal side edges of the pressure chamber 2, and end seals (see FIG. 2) are provided to control leakage between the belt and the end edges of the pressure chamber.

Each labyrinth seal 3 comprises a sealing member 4 of aluminum alloy extending along and in airtight engagement with an edge of the pressure chamber 2. The sealing member has three channels 5, 6, 7 formed therein, in which are located the three rubber ribs 8, 9, 10 on the belt surface which are nearest to the respective belt edge. The ribs 8, 9, 10 are faced with polypropylene and together with their respective channels 5, 6, 7 constitute complementary interengaging longitudinally extending formations. The channel 5 nearest to the edge of the belt, and its corresponding rib 8, both have an inverted U-shape in cross section, whereas the remainder of the ribs and channels are substantially rectangular in cross section.

The lower wall 1 of the pressure chamber 2 takes the form of a pressure distribution plate 11 which separates the pressure chamber from a supply chamber 12 below the pressure chamber, the supply chamber being directly connected to an air pump.

The pressure distribution plate 11 is of permeable ceramic material which will allow air to diffuse rapidly through the plate without a large difference in pressure between the supply chamber 12 and the pressure chamber 2.

The effect of the pressure distribution plate 11 is to obviate the possibility that a significant air pressure differential might build up between spaced-apart areas on the lower surface of the belt 1, for example areas adjacent to the supply of air pressure and other such areas further from the supply. The pressure distribution plate ensures that the supply of air to the whole air-supported area of the belt is at substantially a common rate.

End sealing means is provided at each end of the pressure chamber to reduce air leakage between the belt and the ends of the pressure chamber.

As shown in FIG. 2, the end sealing means comprises a roller 13 mounted on support means and in engagement with the lower surface of the belt 1.

The support means for each roller 13 constitutes an end wall of the pressure chamber 2 and comprises an inflatable fabric reinforced rubber diaphragm 14 connected to an air pressure supply (not shown) through an air inlet 15. The diaphragm provides the roller with vertically-directed support and urges the roller into engagement with the lower surfaces of the belt. Two generally U-shaped guides 16 are provided one at each end of each roller 13 for engagement with axles 17 projecting from the rollers at each end thereof, the guides being arranged to allow vertical movement of the roller but to prevent horizontal movement thereof.

The outer surface of the roller is formed by a sleeve of low friction material (not shown), and upon inflation of the diaphragm the roller is held in engagement with the under-surface of the belt in rolling contact therewith, the sleeve of low friction material reducing the resistance to rotation of the roller caused by the diaphragm.

The roller and the diaphragm together thus seal the gap between the belt and one end of the pressure chamber, and the spillage of air round the roller which occurs during operation serves to "lubricate" the area of contact between the belt and the roller.

A transversely rigid belt is used in this embodiment, that is, the belt is more flexible in a longitudinal direction than in a direction transverse to its length. The belt is of the kind described and claimed in our U.K. Pat. Specification No. 974,131, and comprises a plurality of steel cords arranged in uniformly close side-by-side relationship, each cord extending in a direction transverse to the length of the belt. The steel cords form part of two plies of rubbered steel cord laid one above the other and between which there is a layer of high modulus rubber and a tensile member so arranged that the centers of the steel cord are about three-eighths of an inch apart. The tensile member is in the form of 4 plies of 42 ounce per square yard woven cotton fabric. Both the inner and outer surfaces of the belt are provided with a rubber covering layer, this layer being moulded into a series of substantially parallel longitudinal ribs on the outer surface of the belt, each of a quarter of an inch square cross section with one-sixteenth of an inch under-pattern depth. The rubber covering layer on the inner surface of the belt is one-sixteenth of an inch thick.

In a second embodiment of the invention otherwise similar to the first embodiment and illustrated in FIG. 3, the pressure distribution plate 18 is of a nonporous material and is arranged to allow the required flow of air to pass therethrough by the provision therein of a plurality of apertures 19 and associated fluid flow control valves 20 with which the belt is arranged to be engageable and which are responsive to the downward thrust of the belt thereon.

Each valve 20 comprises a ball 21 of metal or hard plastic material slidably mounted in an apertured cylindrical valve guide 22 which extends from the base of the supply chamber 23 to its respective aperture 19 in the pressure distribution plate, and has a diameter slightly greater than that of the ball.

The ball 21 is normally held in sealing engagement with the concave side edge constituting a valve seat of its respective aperture 19 in the pressure distribution plate 18 and projecting a small distance above the upper surface thereof, by a coil spring 24 also mounted in the valve guide 22.

In operation, the unloaded belt 25 passing over the pressure distribution plate 18 just unseats the balls 21 from their valve seats, allowing sufficient air to pass from the supply chamber 23 through the apertures 26 in the valve guides 22, round the balls, and so to the space 27 between the pressure distribution plate and the undersurface of the belt, to support the unloaded belt. The space 27 constitutes the pressure chamber. The unloaded condition of the belt is shown at the left-hand side in FIG. 3.

The loaded condition of the belt is shown at the right-hand side in FIG. 3. When a load (indicated by the arrow W) is placed upon the belt, the belt sinks slightly, opening the respective ball valves further until the air pressure in the pressure chamber 27 is sufficient to support the belt and its load.

In a third embodiment of the invention, sown in FIG. 4, and also otherwise similar to the first embodiment, only two complete channels are formed in the sealing member 28 to cooperate with the ribs 29 of the belt 30, and the internal surface of each channel 31 formed in the sealing member is uneven, having longitudinally extending corrugations formed therein. These corrugations are formed also in the areas of the sealing member between the channels, and have the effect of allowing at least a certain minimum rate of flow of air between the belt edges and the sealing member.

In a fourth embodiment of the invention, shown in FIG. 5, a conveyor otherwise similar to the conveyor of the first embodiment is provided with a raised convoluted sidewall 32 at each edge of the belt 33, and side seals each comprising a single sealing rib 34 formed on the respective belt edge and located within a single corresponding channel 35 formed in the sealing member 36.

Each sidewall is in the form of a base portion 37 secured to the edge of the belt and a wall portion 38 inclined at an acute angle to the base portion. The wall portion extends upwardly and away from the belt, and the rounded sealing rib 34 formed adjacent the edge of the belt on the base portion.

The convolutions formed in the sidewall allow it to open and close fan-wise as the belt changes direction at each end of a run, and thereby prevent undue tensile stress and consequent cracking of the sidewall.

A transversely rigid belt 24-inches wide is employed. Details of the belt construction are not shown in the drawings but are as follows: Two plies of rubbered steel tier cord are interspaced with a layer of high modulus rubber and a tensile member in the form of two layers of longitudinal nylon cord. The steel cords are arranged to lie transversely across the belt, are closely and uniformly spaced in the longitudinal direction of the belt, and both the inner and outer surfaces of the belt are provided with a covering layer of rubber, the outer layer being one-eighth of an inch thick and the inner layer a sixteenth of an inch thick.

This embodiment of the invention is particularly suitable for use in conveying loose articles or materials.

The pressure distribution plate of conveyors according to the invention may be manufactured from ceramics, expanded rubber, fused ballotini and other ferrous or nonferrous materials.

Additional means for producing a constant fluid pressure over the whole air-supported surface of the belt may be provided in the form of a series of baffles mounted in the supply chamber.

The air pressure applied to the belt in the pressure chamber is lower than the air pressure supplied to the supply chamber, due to the resistance to air flow provided by the pressure distribution plate and by the baffles, and the pressure applied to the belt depends on the construction of both these components.

However, it has been found that air pressures of between 7 and 10 pounds per square inch in the supply chamber produce corresponding pressures of 5 to 7 pounds per square inch at the belt surface, and these pressures are sufficient to lift and support the belt and any reasonable load placed thereon.

Where the belt of a conveyor according to the invention is provided with a raised sidewall at each of its edges, the height of the wall portion is chosen to suit any particular requirements such as those made by the nature of the material being carried. The rib at the edge of such a belt which forms part of the seal between the belt and the pressure chamber may be formed either on the base portion of the sidewall or on the belt itself.

Conveyors according to the invention are particularly suitable for transporting passengers or fragile articles, since the fluid support of the belt ensures a smooth ride for anything carried thereon. Also, due to the relatively very low coefficient of friction between the belt and its support, a less powerful motor is needed to drive the belt.

Although embodiments of the invention which have been described are conveyors having air-supported belts, the scope of the invention is not limited thereto for if required other fluids, both gases and liquids could be used instead of air in conveyors as described in this specification.

We claim:

1. A conveyor comprising an endless belt at least part of which is supported by fluid pressure support means comprising:
   a. a fluid pressure chamber in which the belt constitutes the upper surface thereof;
   b. side seals on said chamber comprising longitudinally extending formations on the belt which interengage complementary longitudinally extending formations formed in said chamber said formations having longitudinally extending corrugations formed therein.

2. A conveyor according to claim 1 wherein the surfaces of the formations on the belt or of the formations associated with the pressure chamber are of a material having a low coefficient of friction.

3. A conveyor according to claim 1 wherein at least one formation at each side edge of the belt and the corresponding formation associated with the pressure chamber have rounded cross-sectional profiles.

4. A conveyor according to claim 1 including end seals in said chamber comprising a roller mounted for rolling engagement with the lower surface of the belt.

5. A conveyor according to claim 4 wherein the surface of the roller is of a material having a low coefficient of friction.

6. A conveyor according to claim 4 wherein means is provided for urging the roller into engagement with the lower surface of the belt.